US012804518B2

(12) United States Patent
Li

(10) Patent No.: US 12,804,518 B2
(45) Date of Patent: Nov. 17, 2026

(54) ACCESS CONTROL PROCESSING METHOD AND APPARATUS, AND COMMUNICATION DEVICE AND STORAGE MEDIUM

(71) Applicant: Beijing Xiaomi Mobile Software Co., Ltd., Beijing (CN)

(72) Inventor: Yanhua Li, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 334 days.

(21) Appl. No.: 18/578,572

(22) PCT Filed: Jul. 13, 2021

(86) PCT No.: PCT/CN2021/106118
§ 371 (c)(1),
(2) Date: Jan. 11, 2024

(87) PCT Pub. No.: WO2023/283809
PCT Pub. Date: Jan. 19, 2023

(65) Prior Publication Data
US 2025/0008415 A1 Jan. 2, 2025

(51) Int. Cl.
*H04W 48/10* (2009.01)
*H04W 68/02* (2009.01)

(52) U.S. Cl.
CPC ........... *H04W 48/10* (2013.01); *H04W 68/02* (2013.01)

(58) Field of Classification Search
CPC ..... H04W 48/10; H04W 68/02; H04W 48/02; H04W 48/16
USPC .......................................................... 455/458
See application file for complete search history.

(56) References Cited

U.S. PATENT DOCUMENTS

| | | | | |
|---|---|---|---|---|
| 10,003,972 | B2 * | 6/2018 | Pinheiro et al. | H04W 12/08 |
| 11,864,026 | B2 * | 1/2024 | Patil | H04W 48/02 |
| 12,127,104 | B2 * | 10/2024 | Klatt | H04W 48/06 |
| 2014/0171061 | A1 | 6/2014 | Larmo et al. | |
| 2016/0262130 | A1 * | 9/2016 | Johansson | H04W 76/19 |
| 2021/0092669 | A1 | 3/2021 | Wang et al. | |

FOREIGN PATENT DOCUMENTS

| | | | | |
|---|---|---|---|---|
| CN | 105165065 | A | 12/2015 | |
| CN | 110574431 | A | 12/2019 | |
| CN | 111052791 | A | 4/2020 | |
| EP | 3 214 872 | A1 | 9/2017 | |
| WO | WO 2012/094923 | A1 | 7/2012 | |
| WO | WO-2013025148 | A1 * | 2/2013 | H04W 74/006 |

(Continued)

OTHER PUBLICATIONS

Zhang, Fayou et al. (WO 2017020553 A1), Method and Device for Establishing Wireless Connection, Feb. 9, 2017, all pages and figures. (Year: 2017).*

(Continued)

*Primary Examiner* — Mahendra R Patel
(74) *Attorney, Agent, or Firm* — Oblon, McClelland, Maier & Neustadt, L.L.P.

(57) ABSTRACT

Provided in the present disclosure are an access control processing method and apparatus, and a communication device and a storage medium. The access control processing method is executed by a first network device, and same comprises: sending AC information, wherein the AC information can be used for controlling access of a UE group.

17 Claims, 5 Drawing Sheets

(56) References Cited

FOREIGN PATENT DOCUMENTS

| | | | | | |
|---|---|---|---|---|---|
| WO | WO-2015101100 | A1 * | 7/2015 | ........... | H04L 41/344 |
| WO | WO 2016/154903 | A1 | 10/2016 | | |
| WO | WO-2017020553 | A1 * | 2/2017 | ............ | H04W 48/08 |
| WO | WO-2017076255 | A1 * | 5/2017 | ............ | H04W 88/06 |
| WO | WO 2017/0880294 | A1 | 6/2017 | | |
| WO | WO 2019/215331 | A1 | 11/2019 | | |

OTHER PUBLICATIONS

Zheng, Zongzhao et al. (WO 2015101100 A1), Network Device and Service Processing Method in Network, Jul. 9, 2015, all pages an figures. (Year: 2015).*

International Search Report mailed on Apr. 7, 2022 in PCT/CN2021/106118 filed on Jul. 13, 2021 (6 pages).

"Unified access control for access control of SNPN and CAG capable UEs", 3GPP TSG-SA WG2 Meeting #132, OPPO, S2-1903487, 2019, 3 pages.

"PLMN selection based on Preferred CioT Network Behavior", Qualcomm Incorporated, 3GPP TSG-CT WG1 Meeting #116, CI-192294, 2019, 5 pages.

"3rd Generation Partnership Project; Technical Specification Group Core Network and Terminals; Non-Access-Stratum (NAS) protocol for Evolved Packet System (EPS); Stage 3 (Release 17)", 3GPP TS 24.301 V17.11.0 (Sep. 2023), 604 pages.

"3rd Generation Partnership Project; Technical Specification Group Radio Access Network: Evolved Universal Terrestrial Radio Access (E-UTRA); Radio Resource Control (RRC); Protocol specification (Release 17)", 3GPP TS 36.331 V17.6.0 (Sep. 2023), 1120 pages.

China Mobile, "Adding potential requirement of Immersive VR games", 3GPP TSG-SA WG1 Meeting #94bis-e, S1-212080, Jul. 2021, 2 pages.

Xiaomi, "TACMM New Use Case Smart-Factory backup in Multi-modality Interaction System", 3GPP TSG-SA WG1 Meeting #94bise, S1-212071, Jul. 2021. 3 pages.

Combined Chinese Office Action and Search Report issued on Jun. 28, 2025 in Chinese Patent Application No. 202180002150.4 (with English translation), 21 pages.

* cited by examiner

ACCESS CONTROL PROCESSING METHOD AND APPARATUS, AND COMMUNICATION DEVICE AND STORAGE MEDIUM

CROSS-REFERENCE TO RELATED APPLICATIONS

The present application is a national phase application of International Application No. PCT/CN2021/106118, filed on Jul. 13, 2021, and the entire contents thereof are incorporated herein by reference.

BACKGROUND

Technical Field

The present disclosure relates to but is not limited to the field of communication technology, and in particular, to an access control processing method, apparatus, communication device and storage medium.

Description of the Related Art

In related technologies, multimodality involves multiple sources or forms of information; for example, people have touch, hearing, vision, and smell; the media of information include voice, video, text, etc. In order to sense user input from multiple dimensions, there are many types and numbers of applications (APPs) and/or devices used for multimodality information collection, including multiple cameras, speakers, sensors, keyboards, fingerprint collectors, etc. These devices that collect multimodality information can be used on the same device or across devices. In a single-user, single-device, multimodality scenario, for example, the user's video can be collected through the camera on the same handheld terminal, and the user's voiceprint can also be collected through the sensor on the mobile phone, that is, the information of the two modalities can be obtained at the same time.

When multimodality involves multiple inputs, the multiple inputs may only be on one user equipment (UE) or may across multiple UEs; currently a conventional idea is that the application (APP) layer can initiate the service, and make decisions based on multiple inputs It should be noted that, information disclosed in the above background portion is provided only for better understanding of the background of the present disclosure, and thus it may contain information that does not form the prior art known by those ordinary skilled in the art.

SUMMARY

Embodiments of the present disclosure disclose an access control processing method, apparatus, communication device, and storage medium.

According to a first aspect of an embodiment of the present disclosure, an access control processing method is provided, wherein the method, executed by a first network device, includes sending AC information, wherein the AC information is able to control access of a user equipment UE group.

According to a second aspect of an embodiment of the present disclosure, an access control processing method is provided, wherein the method, executed by a UE, includes receiving AC information, and performing access control of the UE based on the AC information and the UE group to which the UE belongs.

According to a third aspect of the embodiment of the present disclosure, an access control processing apparatus is provided, applied to a first network device, including a first sending module is configured to send AC information, where the AC information is able to control access of the UE group.

According to a fourth aspect of the embodiment of the present disclosure, an access control processing apparatus is provided, applied to a UE, including a second receiving module, configured to receive AC information, and a processing module, configured to perform access control of the UE according to the AC information and the UE group to which the UE belongs.

According to a fifth aspect of the embodiment of the present disclosure, a communication device is provided, including a processor and a memory for storing instructions executable by the processor. The processor is configured to implement the access control processing method according to any embodiment of the present disclosure when running the executable instructions.

According to a sixth aspect of an embodiment of the present disclosure, a computer storage medium is provided, wherein the computer storage medium stores a non-transitory computer executable program, and when the executable program is executed by a processor, the access control processing method of any embodiment of the present disclosure is implemented.

It is to be understood that both the foregoing general description and the following detailed description are exemplary and explanatory only and are not restrictive of the embodiment of the present disclosure.

BRIEF DESCRIPTION OF THE DRAWINGS

Various exemplary embodiments of this disclosure that are proposed as examples will be described in detail with reference to the following figures, wherein like numerals reference like elements, and wherein.

DETAILED DESCRIPTION OF THE PREFERRED EMBODIMENTS

Exemplary embodiments will be described in detail herein, examples of which are illustrated in the accompanying drawings. When the following description refers to the drawings, the same numbers in different drawings refer to the same or similar elements unless otherwise indicated. The implementations described in the following exemplary embodiments do not represent all implementations consistent with embodiments of the present disclosure. Rather, they are merely examples of apparatus and methods consistent with certain aspects of embodiments of the present disclosure as detailed in the appended claims.

Terms used in the embodiments of the present disclosure is for the purpose of describing specific embodiments only and is not intended to limit the embodiments of the present disclosure. As used in the embodiments of the present disclosure and the appended claims, the singular forms "a", "an" and "the" are intended to include the plural forms as well, unless the context clearly dictates otherwise. It will also be understood that the term "and/or" as used herein refers to and includes any and all possible combinations of one or more of the associated listed items.

It should be understood that although the terms first, second, third, etc. may be used to describe various information in the embodiments of the present disclosure, the information should not be limited to these terms. These terms are only used to distinguish information of the same type from each other. For example, without departing from the scope of the embodiments of the present disclosure, the first information may also be referred to as second information, and similarly, the second information may also be referred to as first information. Depending on the context, the word "if" as used herein may be interpreted as "when" or "while" or "in response to determining".

Figure 1:
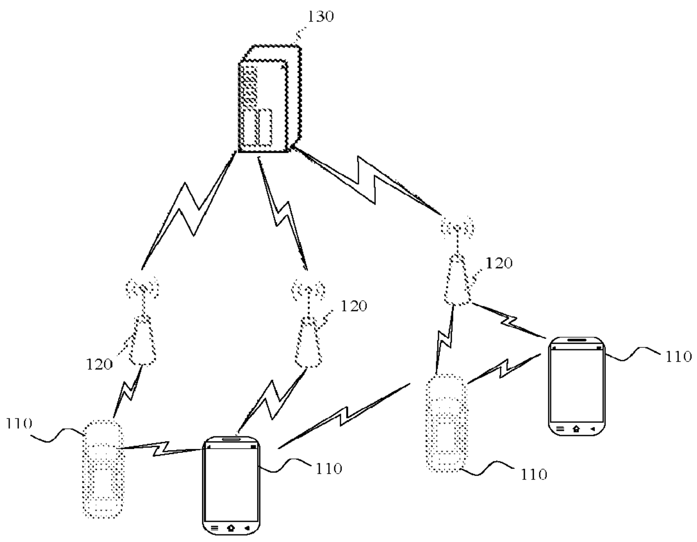
FIG. 1 is a schematic structural diagram of a wireless communication system.

Please refer to FIG. 1, which shows a schematic structural diagram of a wireless communication system provided by an embodiment of the present disclosure. As shown in FIG. 1, the wireless communication system is a communication system based on cellular mobile communication technology. The wireless communication system may include: several UEs 110 and several base stations 120.

In the embodiment, the user equipment 110 may be a device that provides voice and/or data connectivity to a user. The user equipment 110 can communicate with one or more core networks via a Radio Access Network (RAN). The user equipment 110 can be an Internet of Things user equipment, such as a sensor device, a mobile phone (or so-called "Cellular" phone) and computers with IoT user equipment, for example, may be stationary, portable, pocket-sized, handheld, computer-built-in, or vehicle-mounted devices. For example, station (STA), subscriber unit, subscriber station, mobile station, mobile, remote station, access point, remote terminal, access terminal, user terminal, user agent, user device, or user equipment. Alternatively, the user equipment 110 may also be equipment of an unmanned aerial vehicle. Alternatively, the user equipment 110 may also be a vehicle-mounted device, for example, it may be an onboard computer with a wireless communication function, or a wireless user equipment externally connected to an onboard computer. Alternatively, the user equipment 110 may also be a roadside device, for example, it may be a street light, a signal light or other roadside device with a wireless communication function.

The base station 120 may be a network-side device in a wireless communication system. In the embodiment, the wireless communication system may be a fourth-generation mobile communication technology (4G) system, also known as a Long Term Evolution (LTE) system; or, the wireless communication system may also be a 5G system, also known as a new air interface system or 5G NR system. Alternatively, the wireless communication system may also be a next-generation system of the 5G system. In the embodiment, the access network in the 5G system can be referred to as the New Generation-Radio Access Network (NG-RAN).

In the embodiment, the base station 120 may be an evolved base station (eNB) used in the 4G system. Alternatively, the base station 120 may also be a base station (gNB) using a centralized distributed architecture in the 5G system. When the base station 120 adopts a centralized distributed architecture, it usually includes a central unit (CU) and at least two distributed units (DU). The central unit is equipped with a protocol stack including a Packet Data Convergence Protocol (PDCP) layer, a Radio Link Control (RLC) layer, and a Medium Access Control (MAC) layer. The distributed unit is provided with a physical (PHY) layer protocol stack, and the embodiment of the present disclosure does not limit the specific implementation of the base station 120.

A wireless connection can be established between the base station 120 and the user equipment 110 through the wireless air interface. In different implementations, the wireless air interface is a wireless air interface based on the fourth generation mobile communication network technology (4G) standard; or, the wireless air interface is a wireless air interface based on the fifth generation mobile communication network technology (5G) standard, e.g., the wireless air interface is a new air interface; or, the wireless air interface can also be a wireless air interface based on the next generation mobile communication network technology standard of 5G.

In some embodiments, an E2E (End to End) connection can also be established between the UEs 110. For example, scenarios in the vehicle networking communication (vehicle to everything, V2X) such as vehicle to vehicle (V2V) communication, vehicle to infrastructure (V2I) communication and vehicle to pedestrian (V2P) communication.

Here, the above user equipment can be considered as the terminal device of the following embodiments.

In some embodiments, the above-mentioned wireless communication system may also include a network management device 130.

Several base stations 120 are connected to the network management device 130 respectively. The network management device 130 may be a core network device in a wireless communication system. For example, the network management device 130 may be a mobility management entity (MME) in an evolved packet core network (EPC). Alternatively, the network management device can also be other core network devices, such as Serving GateWay (SGW), Public Data Network GateWay (PGW), Policy and Charging Rules Function (PCRF) or Home Subscriber Server (HSS), etc. The embodiment of the present disclosure does not limit the implementation form of the network management device 130.

In order to better understand the technical methods described in any embodiment of the present disclosure, first, a partial explanation of UE access control and multimodality services is provided.

In one embodiment, the structure of the parameter of the access control (AC barring) is provided for each Public Land Mobile Network (PLMN), each access category, and each access identification. Table 1 below gives an example, in which the maximum number of PLMNs is 6, and the maximum number of access categories and access identifiers are 64 and 16 respectively.

TABLE 1

| AC parameters | | | |
|---|---|---|---|
| PLMN id | Access categories | Access identities | AC barring parameter |
| PLMN id 1 | Access category 1 | Access id 0 | xxx |
| | Access category 1 | Access id 1 | xxx |
| | Access category 1 | Access id 2 | xxx |
| | . . . | . . . | . . . |
| | Access category 1 | Access id 15 | xxx |
| | . . . | . . . | . . . |
| | Access category 63 | Access id 15 | xxx |
| . . . | . . . | . . . | . . . |
| PLMN id 6 | . . . | . . . | . . . |
| | Access category 63 | Access id 15 | xxx |

In the embodiment, the access categories may include at least one of the following: active signaling transmission ("originating signaling"); emergency calls; initiating VOLTE voice call ("originating MMTEL voice"); initiating VOLTE Video call ("originating MMTEL video"); originating SMSo IP call ("originating SMSoIP"); originating text message ("originating SMS"); called ("terminating calls"); calling ("originating calls"); circuit fallback mobile originating call ("mobile originating CS fallback").

Access identities, which are a type of user identification, can be understood as attributes of the UE. For example, 0-9 are ordinary users, and 11-15 are high-priority users.

The definition of the AC barring parameter is as follows, in which a random number and the "barring" validity period are defined for non-special user IDs; while for services with special user IDs, a bitmap is used.

```
UAC-BarringInfoSetList ::=   SEQUENCE (SIZE(1..maxBarringInfoSet)) OF UAC-
BarringInfoSet
  UAC-BarringInfoSet ::=   SEQUENCE {
    uac-BarringFactor   ENUMERATED {p00, p05, p10, p15, p20, p25, p30, p40,
                               p50, p60, p70, p75, p80, p85, p90, p95},
    uac-BarringTime   ENUMERATED {s4, s8, s16, s32, s64, s128, s256,
s512},
    uac-BarringForAccessIdentity   BIT STRING (SIZE(7))
  }
```

In one embodiment, the basic access control (AC barring check) process is to determine user access categories, obtain AC barring parameters, and perform AC barring check. The AC barring parameter usually takes the form of a random number for ordinary users (0-9), while for high-priority users (11-15), it takes the form of a bitmap.

In one embodiment, the AC parameters will be defined in the system message (SIB1) as follows. For the random number method, if it is barred, a timer needs to be started, and its duration will be calculated through the access control barring time (ac-BarringTime).

The current AC process is performed at the AS layer, and the decision process is based on the input of the non-access layer (NAS). Here the NAS layer only provides an access identifier to the AS layer.

Figure 2:
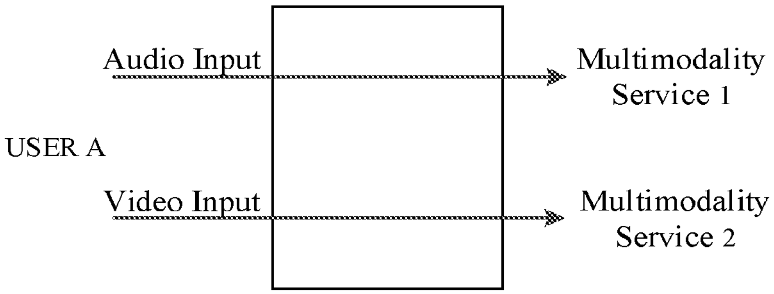
FIG. 2 is a schematic diagram of a multi-modal service according to an exemplary embodiment.

In one embodiment, the multimodality service may be multiple input services on one UE, or input services of multiple UEs. For example, as shown in FIG. 2, a schematic diagram of a multimodality service is shown; wherein the audio input corresponds to the multimodality service 1, and the video input corresponds to the multimodality service 2; the audio input and the video input are two services for the same user (such as user A).

Figure 3:
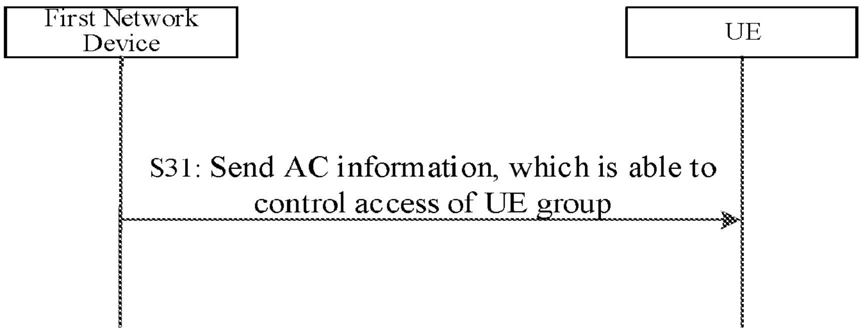
FIG. 3 is a schematic diagram of an access control processing method according to an exemplary embodiment.

As shown in FIG. 3, an embodiment of the present disclosure provides an access control processing method, which is executed by a first network device, including:

Step S31: Send AC information, where the AC information is able to control access of the UE group.

In one embodiment, the first network device may be an access network device or a core network device.

In one embodiment, the access network device may be, but is not limited to, a base station. The base station can be an interface device for UE to access the Internet. The base station can be various types of base stations. For example, the base station can be a 3G base station, a 4G base station, a 5G base station or other evolved base stations.

In one embodiment, the core network device may be, but is not limited to, various physical entities or logical entities of the core network; for example, the core network device may be a mobility management entity or a service gateway.

Embodiments of the present disclosure provide an access control processing method, which is executed by the first network and may include: sending AC information to the UE.

A UE can be various mobile terminals or fixed terminals. For example, the UE may be, but is not limited to, a mobile phone, a computer, a server, a wearable device, a game control platform or a multimedia device, etc.

In one embodiment, the UE includes: Radio Resource Control (RRC) idle state UE, RRC inactive state UE and/or RRC connected state UE.

Taking the base station as an example, when the core network device sends information, it may mean that the core network device first sends the information to the base station, and the base station forwards the information to the UE. When the UE sends information to the core network device, it may mean that the UE sends the information to the base station, and then the base station forwards the information to the core network device.

In one embodiment, the AC information may include: first type AC information for a UE group; and/or second type AC information for all UEs in the cell.

Exemplarily, the first network device sends the first type of AC information for the UE group, where the first type of AC information can control access of the UE group.

Exemplarily, the first network device sends the second type of AC information for all UEs in the cell, where the second type of AC information can control access control of all UEs in the cell.

In one embodiment, the AC information includes at least one of the followings.

The control indication, indicating whether access control is required.

The first group information, indicating the UE group that requires access control.

The second group information, indicating the UE group that does not require access control.

The status indication, indicating the UE status on which the control indication applies, wherein the UE status includes: at least one of RRC connected state, RRC idle state and RRC inactive state.

The first service indication, indicating the service that requires access control.

The second service indication, indicating the service that does not require access control.

The first level indication, indicating the access level of the UE group that requires access control.

The second level indication, indicating the access level of the UE group that does not require access control.

The duration indication, indicating the barring duration of the service.

Here, the control indication, the first group information, the second group information, the status indication, the first service indication, the second service indication, the first level indication, the second level indication and the duration indication can all be indicated by one bit or multiple bits of the AC information.

Embodiments of the present disclosure provide an access control processing method, which is executed by a first network device and may include: sending a control indication, indicating whether access control is required. The control indication here may be indicated by one bit or multiple bits of the AC information. When the control instructions here take different values, the corresponding instructions have different meanings. For example, when the first control indication is “1”, it indicates that access control is required; when the second control indication is “0”, it indicates that access control is not required. For another example, when the first control indication is “01”, it indicates that access control needs to be entered; when the second control indication is “00”, it indicates that access control is not required.

In this way, in the embodiment of the present disclosure, the control indication sent by the first network device can be used to inform the UE whether the group to which it belongs needs to perform access control. Thus, it is helpful to reduce the situation that multiple UEs request to establish service while only part of the service requests are completed. Collaborative processing of service access by multiple UEs can be realized.

Embodiments of the present disclosure provide an access control processing method, which is executed by a first network device and may include: sending group information, where the group information includes: first group information or second group information; wherein the first group information indicates the UE group that needs to perform access control; and the second group information indicates the UE group that does not need to perform access control. For example, when the first group information is “1010”, it indicates that the UEs in the first and third groups need to perform access control; for another example, when the second group information is “0001”, it indicates that the UEs in the fourth group do not need to perform access control. Another example is directly notifying the group number that does not require admission control. For example, if the first group is notified, all users belonging to the first group do not need to perform access control. The first group information and the second group information here are carried in different information fields of the AC. For example, the first predetermined information field of the AC information carries the first group information, and the second predetermined information field of the AC carries the second group information.

In this way, in this embodiment of the present disclosure, UEs can be grouped, and access control can be performed on the group of UEs. For example, if the AC information includes the second group information, when the UE receives the AC information including the second group information, it is determined that neither the UE nor other UEs in the group to which the UE belongs need to perform access control operations.

Of course, in other embodiments, the group information may also indicate whether a single UE needs access control. For example, the group information includes: third group information and fourth group information; where the third group information indicates UEs that need to perform access control; and the fourth group information indicates UEs that do not need to perform access control.

Embodiments of the present disclosure provide an access control processing method, which is executed by a first network device and may include: sending a status indication; wherein the status indication indicates that the control indication applies on at least one of RRC connected state, RRC idle state and RRC inactive state. Here, when the control indication has different values, it may indicate different UE states on which the control indication is applied. For example, when the control indication is “000”, it indicates that the control indication applies on UEs in all states, where all states include but are not limited to: RRC connected state, RRC idle state, and RRC inactive state. For another example, when the control indication is “001”, it indicates that the control indication applies on the UE in the RRC connected state. For another example, when the control indication is “001”, it indicates that the control indication applies on the RRC idle state UE. For another example, when the control indication is “011”, it indicates that the control indication applies on RRC idle state UEs and RRC inactive state UEs, and so on.

In this way, in the embodiment of the present disclosure, it is possible to based on the first network device sending the status indication, inform the UE of which status of the UE the control indication is valid for; thereby allowing the UE to accurately know which status of the UE needs to perform access control, or does not need to perform access control.

Embodiments of the present disclosure provide an access control processing method, which is executed by a first network device and may include: sending a service indication; wherein the service indication includes: a first service indication or a second service indication; wherein the first service indication indicates services that require access control; and the second service indication indicates services that do not require access control. For example, when the first service indication takes different values, it indicates different services or service sets that need to enter access control; when the second service indication takes different values, it indicates different services or service sets that do not need to enter access control.

In one embodiment, the services include but are not limited to at least one of the following: active signaling transmission; emergency call initiating VOLTE voice call; initiating VOLTE video call; initiating SMSo IP call; initiating text message (“originating SMS”); being called; calling; mobile caller with circuit fallback.

In this way, in the embodiment of the present disclosure, it is possible to based on the first network device sending the service indication, inform the UE of which service or service set require access control or not; thereby allowing the UE to accurately know which service or service set of the UE needs to perform access control, or does not need to perform access control.

Embodiments of the present disclosure provide an access control processing method, executed by a first network device, which may include: sending a level indication; wherein the level indication includes: a first level indication or a second level indication; wherein the first level indication indicates the access level of the UE group that requires access control; and the second level indication indicates the access level of the UE group that does not require access control. The levels here include but are not limited to: ordinary level or high priority level, wherein, the ordinary level can include: “0” to “9” levels in the order from low to high; the high priority level can include “11” to “15” levels in the order from low to high; and wherein, the priority of the ordinary level is lower than the priority of the high priority.

In this way, in the embodiment of the present disclosure, it is possible to based on the first network device sending the level indication, inform the UE of which level requires access control or not; thereby allowing the UE to accurately know which level of the UE needs to perform access control, or does not need to perform access control. In this way, it is beneficial for the UE to allow services with a relatively high priority level to be accessed first, thereby optimizing the wireless communication of the UE.

Embodiments of the present disclosure provide an access control processing method, which is executed by the first network device and may include: a duration indication indicating the barring duration of a service or service set.

For example, the first network device sends a duration indication to indicate a barring duration for not allowing access to the service. For example, a timer is set in the first network device, and the timer duration is the barring duration for not allowing access to the service. In one embodiment, the timing duration of a timer may correspond to the barring duration of one or more services.

Exemplarily, the first network device sends a duration indication to indicate the barring duration corresponding to the plurality of barred access services. For example, multiple timers are set in the first network device, and the timing duration of one timer corresponds to the barring duration of one service.

In this way, in the embodiment of the present disclosure, it is possible to based on the first network device sending the duration indication, inform the UE of the barring duration of one service or multiple services that are not allowed to access the network. In this way, the UE can initiate a request for the service after the barring period, thereby reducing the waste of resources caused by the service being continuously initiated during the barring period.

Embodiments of the present disclosure provide an access control processing method, which includes: a base station sending the control indication, and a core network device sending at least none of the control indication, first group information, second group information, status indication, first service indication, second service indication, first-level instruction, second-level instruction, and duration instruction. In this way, in the embodiment of the present disclosure, different execution subjects can also send different AC information. For example, the base station sends a control indication of whether access control needs to be entered, and the core network device sends specific access control details; realizing the division of labor and sending of each information in AC information.

In the embodiment of the present disclosure, the first network device sends AC information that can control the access of the UE group, so that the UE accurately knows whether access control is required for the group to which it belongs. This is conducive to realizing the need for access control of multiple UEs when multiple UEs need to perform access control, that is, realizing collaborative processing of multi-modal services; this can reduce the situation that only part of the service requests are completed when of multiple UEs establish the service requires, thereby optimizing the communication between the UE and the network.

It should be noted that those skilled in the art can understand that the methods provided in the embodiments of the present disclosure can be executed alone or together with some methods in the embodiments of the present disclosure or some methods in related technologies.

In one embodiment, step S31 includes: send AC information to the UE during the UE's attachment process.

Figure 4:
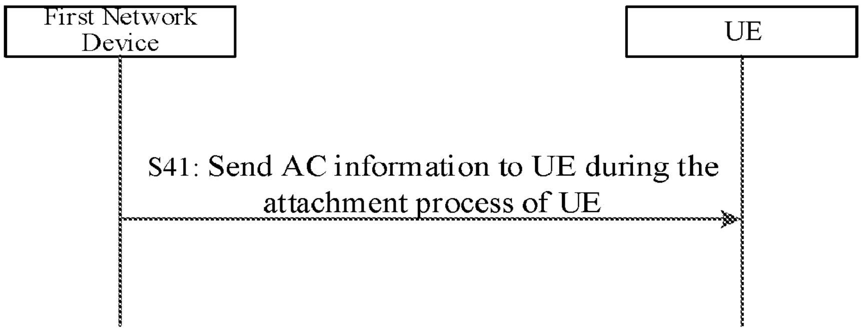
FIG. 4 is a schematic diagram of an access control processing method according to an exemplary embodiment.

As shown in FIG. 4, an embodiment of the present disclosure provides an access control processing method, which is executed by a first network device, including:

Step S41: Send AC information to the UE during the attachment process of the UE.

In some embodiments of the present disclosure, the first network device includes a core network device or a base station; and the AC information is the AC information in step S31.

The UE attachment process here includes, but is not limited to, at least one of the following stages: UE requesting attachment, core network obtaining UE identity, network authentication and encryption, network accepting attachment, establishing default bearer, and completing attachment. The network here includes access network and core network. The first network device may send the AC information in at least one of the stages of network authentication and encryption, network accepting attachment, and establishment of a default bearer. For example, AC information can be sent by sending an attach accept message.

In the embodiment of the present disclosure, the AC information can be sent by the first network device during the attachment process; in this way, the AC information can be sent through the relevant message of the attachment process (such as the attachment accept message), so that two functions can be realized through one message, saving the waste of signaling. Also, usually the UE will release after attaching. If the UE is released, the UE does not need to make an access control decision again for the next connection, and can directly initiate services based on the AC. This can simplify the operation of the UE and save system resources.

It should be noted that those skilled in the art can understand that the methods provided in the embodiments of the present disclosure can be executed alone or together with some methods in the embodiments of the present disclosure or some methods in related technologies.

In one embodiment, sending the AC information includes one of the followings.

Send AC information to UE through broadcast signaling.

Send AC information to the UE through dedicated signaling.

Figure 5:
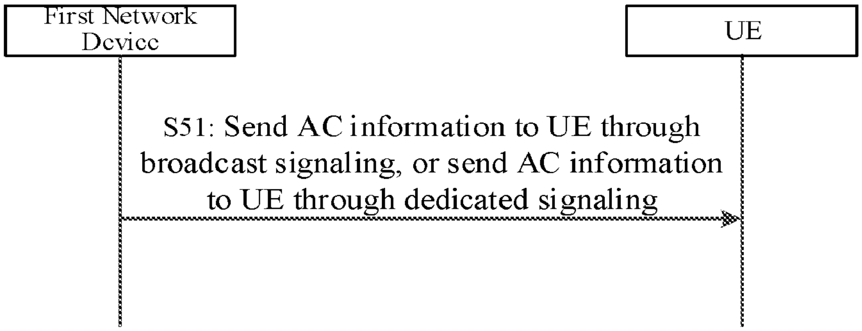
FIG. 5 is a schematic diagram of an access control processing method according to an exemplary embodiment.

As shown in FIG. 5, an embodiment of the present disclosure provides an access control processing method, which is executed by a first network device, including:

Step S51: Send the AC information to the UE through broadcast signaling, or send the AC information to the UE through dedicated signaling.

In some embodiments of the present disclosure, the first network device includes a core network device or a base station; and the AC information is the AC information in step S31.

In one embodiment, the broadcast signaling includes but is not limited to one of the following: a system message, or a paging message.

In one embodiment, sending the AC information to the UE through broadcast signaling may include: sending the AC information to the UE through a broadcast paging message.

Embodiments of the present disclosure provide an access control processing method, which is executed by a first network device, including: sending AC information to a UE through a broadcast paging message.

Exemplarily, the first network device sends downlink control information (DCI), where the DCI carries the AC information.

In this way, in the embodiment of the present disclosure, the AC message can be sent through a broadcast message, and all UEs in the network can be notified, thereby saving signaling overhead. Moreover, in the embodiment of the present disclosure, the AC information can be sent through a paging message, so that the functions of paging and informing the UE whether access control is required can be simultaneously implemented through one message, thereby further saving signaling overhead.

In one embodiment, AC information is sent to the UE through dedicated signaling, including at least one of the followings.

Send AC information to the UE through reconfiguration message.

Send AC information to the UE through connection release message.

Send AC information to the UE through a cell handover message.

Embodiments of the present disclosure provide an access control processing method, which is executed by a first network device and may include: sending AC information to a UE through a reconfiguration message. Exemplarily, the first network device sends a radio resource control reconfiguration (RRC Connection Reconfiguration) message to the UE, where the radio resource control reconfiguration message carries AC information.

In this way, in the embodiment of the present disclosure, the AC message can be sent through the reconfiguration message without the need to send the AC message through additional signaling, thereby saving signaling overhead.

Embodiments of the present disclosure provide an access control processing method, which is executed by a first network device and may include: sending AC information to the UE through a connection release message. Exemplarily, the first network device sends a radio resource control release (RRC Release) message to the UE, where the radio resource control release message carries AC information.

In this way, in the embodiment of the present disclosure, the AC message can be sent through the connection release message without the need to send the AC message through additional signaling, thereby saving signaling overhead.

Embodiments of the present disclosure provide an access control processing method, which is executed by a first network device and may include: sending AC information to a UE through a cell handover message. Exemplarily, the first network device sends a conditional request acknowledgment (HandoverRequestAcknowledge) message to the UE, where the conditional request acknowledgment message carries AC information.

In this way, in the embodiment of the present disclosure, the AC message can be sent through the cell handover message, without the need to send the AC message through additional signaling, thereby saving signaling overhead.

In other embodiments, the dedicated signaling may be any other implementable dedicated signaling, which is not limited here.

In the embodiment of the present disclosure, AC message can be sent through broadcast signaling and dedicated signaling, so that no additional signaling is needed to send AC information, which can save signaling overhead.

In one embodiment, step S31 includes: send AC information to the second network device.

Embodiments of the present disclosure provide an access control processing method, which is executed by a first network device and may include: sending AC information to a second network device.

For example, the first network device is the first base station, and the second network device is the second base station. The first base station sends AC information to the second base station.

Exemplarily, the first base station sends AC information to the second base station through a cell switching message. The first base station here may be a source base station, and the second base station may be a target base station. In this way, sending the AC information of the source base station to the target base station allows the target base station to determine whether the UE group needs to perform access control operations and the like with reference to the AC information.

In this way, in the embodiment of the present disclosure, the AC information can be sent to the second network device (such as the second base station) through the first network device (such as the first base station), thereby realizing the AC information interaction between the base stations or between the core networks. In this way, the second network device can refer to the AC information sent by the first network device to accurately determine whether the corresponding UE group needs to perform access control, etc.

It should be noted that those skilled in the art can understand that the methods provided in the embodiments of the present disclosure can be executed alone or together with some methods in the embodiments of the present disclosure or some methods in related technologies.

The following information processing method is performed by the UE, which is similar to the above description of the access control processing method performed by the first network device; and, for the technical details of the access control processing method performed by the UE which are not disclosed in the embodiment, please refer to the description of the example of the access control processing method performed by the first network device, which will not be described in detail here.

Figure 6:
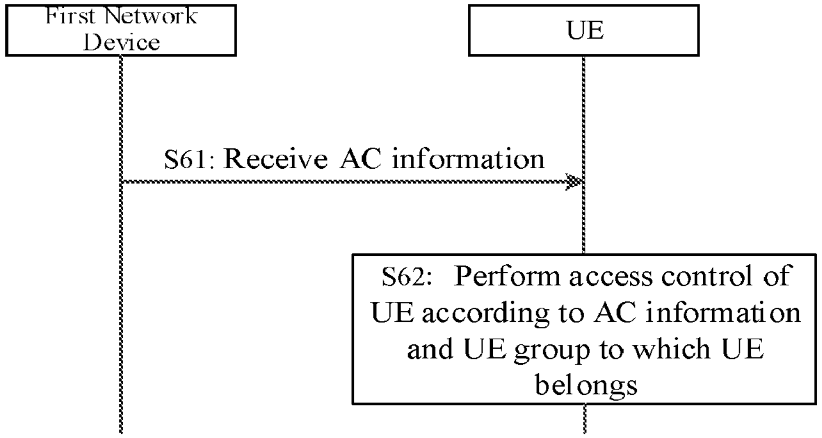
FIG. 6 is a schematic diagram of an access control processing method according to an exemplary embodiment.

As shown in FIG. 6, an embodiment of the present disclosure provides an access control processing method, which is executed by a UE and includes:

Step S61: Receive AC information.

Step S62: Perform access control of the UE according to the AC information and the UE group to which the UE belongs.

In some embodiments of the present disclosure, the AC information is the AC information in step S31.

Embodiments of the present disclosure provide an access control processing method, which is executed by a UE and may include: receiving AC information sent by a first network device.

Embodiments of the present disclosure provide an access control processing method, executed by a UE, which may include: receiving AC information sent by a core network device; and performing access control of the UE based on the AC information and the UE group to which the UE belongs.

Embodiments of the present disclosure provide an access control processing method, which is executed by a UE and may include: receiving AC information sent by a base station; and performing access control of the UE based on the AC information and the UE group to which the UE belongs.

In one embodiment, the AC information includes: first type AC information for the UE group; and/or second type AC information for all UEs in the cell.

In one embodiment, the AC information includes at least one of the followings.

The Control indication, indicating whether access control is required.

The first group information, indicating the UE group that requires access control.

The second group information, indicating the UE group that does not require access control.

The status indication, indicating the UE status on which the control indication applies, wherein the UE status includes: at least one of RRC connected state, RRC idle state and RRC inactive state.

The first service indication, indicating the service that requires access control.

The second service indication, indicating service that does not require access control.

The first level indication, indicating the access level of the UE group that requires access control.

The second level indication, indicating the access level of the UE group that does not require access control.

The duration indication, indicating the barring duration of the service.

Embodiments of the present disclosure provide an access control processing method, which is executed by a UE and may include: receiving a control indication sent by a first network device; wherein the control indication indicates whether access control is required.

Embodiments of the present disclosure provide an access control processing method, executed by a UE, which may include: receiving group information sent by a first network device; wherein the group information includes: first group information or second group information; wherein the first group information indicates the UE group that needs to perform access control; and the second group information indicates the UE group that does not need to perform access control.

Embodiments of the present disclosure provide an access control processing method, which is executed by a UE and may include: receiving a status indication sent by a first network device, where the status indication indicates at least one of an RRC connected state, an RRC idle state, and an RRC inactive state on which the control indication is applied.

Embodiments of the present disclosure provide an access control processing method, executed by a UE, which may include: receiving a service indication sent by a first network device, where the service indication includes: a first service indication or a second service indication; wherein the first service indication indicates the service that requires access control; and the second service indication indicates the service that does not require access control.

Embodiments of the present disclosure provide an access control processing method, executed by a UE, which may include: receiving a level indication sent by a first network device, where the level indication includes: a first level indication or a second level indication; wherein, the first level indication indicates the access level of the UE group that requires access control; and the second level indication indicates the access level of the UE group that does not require access control.

Embodiments of the present disclosure provide an access control processing method, executed by a UE, which may include: receiving a duration indication sent by a first network device, where the duration indication indicates the barring duration of the service.

In one embodiment, step S61 includes: receive AC information during the attachment process of the UE.

Embodiments of the present disclosure provide an access control processing method, which is executed by a UE and may include: receiving AC information during the attachment process of the UE.

In one embodiment, step S61 includes: receiving AC information through broadcast signaling; or receiving AC information through dedicated signaling.

Embodiments of the present disclosure provide an access control processing method, which is executed by a UE and may include: receiving AC information through broadcast signaling; or receiving AC information through dedicated signaling.

In one embodiment, receiving AC information through broadcast signaling includes: receiving AC information through a broadcast paging message.

Embodiments of the present disclosure provide an access control processing method, which is executed by a UE and may include: receiving AC information through a broadcast paging message.

In one embodiment, receiving the AC information through dedicated signaling includes one of the followings.

Receive the AC information through a reconfiguration message.

Receive the AC information through a release message.

Receive the AC information through a handover message.

Embodiments of the present disclosure provide an access control processing method, executed by a UE, which may include: receiving AC information through a reconfiguration message; or receiving AC information through a release message; or receiving AC information through a handover message.

It should be noted that those skilled in the art can understand that the methods provided in the embodiments of the present disclosure can be executed alone or together with some methods in the embodiments of the present disclosure or some methods in related technologies.

Figure 7:
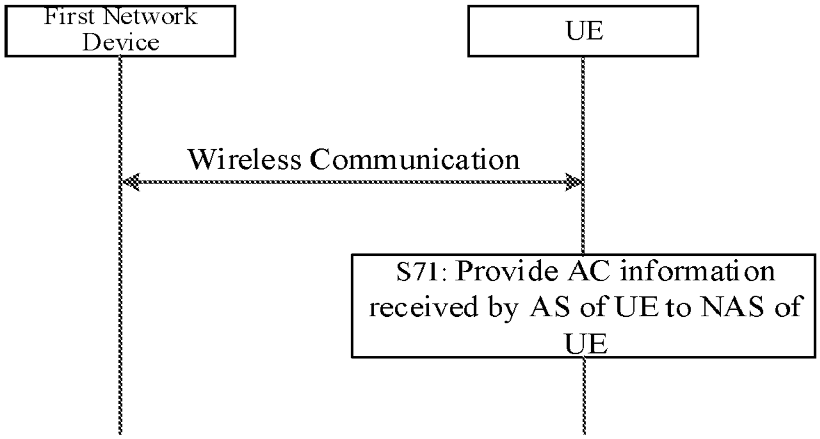
FIG. 7 is a schematic diagram of an access control processing method according to an exemplary embodiment.

As shown in FIG. 7, an embodiment of the present disclosure provides an access control method, which is executed by a UE and includes:

Step S71: Provide the AC information received by the AS of the UE to the NAS of the UE.

In some embodiments of the present disclosure, the AC information is the AC information in step S31.

Here, the UE uses the AS to receive the AC information sent by the first network device, and sends the AC information to the NAS of the UE.

In this way, in the embodiment of the present disclosure, the AC information can be obtained through the AS and provided to the NAS, so that the NAS determines whether to initiate a service.

Embodiments of the present disclosure provide an access control processing method, which is executed by the UE and may include: if it is determined based on the AC information that the service is an access-barred service, determining that the NAS does not initiate a service request for the service.

For example, the AS of the UE can obtain the barring duration and notify the NAS of the barring duration; the barring duration here can be obtained from the indicated duration. Then the NAS of the UE can set the timing length of a timer to the barring duration. When the timer expires, the NAS initiates a service request.

In this way, in the embodiment of the present disclosure, the NAS does not need to continue to initiate calls for services that are prohibited from access, thereby reducing waste of resources.

Embodiments of the present disclosure provide an access control processing method, executed by the UE, which may include: if the service is determined to be an access-allowed service based on the AC information, the NAS sends a service request for the service to the AS; wherein the service request does not carry the service indication of the service.

For example, after the UE's NAS receives the AC information, it obtains from the AC information that the service is an access-allowed service; then the NAS can directly send a service request, and the service request does not carry the service indication of the service or the access category of the service. Then the service request will not trigger the AC decision of the AS.

In this way, in this embodiment of the present disclosure, for services that are allowed to be accessed, the NAS can directly initiate a service request that does not carry the service indication; thus, the AS will not make an AC decision. In this way, embodiments of the present disclosure can directly initiate services based on NAS, which can reduce latency.

Embodiments of the present disclosure provide an access control processing method, which is executed by a UE and may include: storing AC information in the AS of the UE. In this way, in this embodiment of the present disclosure, the AS of the UE stores AC information, which can facilitate subsequent AC decisions.

Embodiments of the present disclosure provide an access control processing method, which is executed by a UE and may include: in response to the UE acquiring the second type of AC information for the cell and the first type of AC information for the UE group, performing access control of the UE based on the first type of AC information preferentially. The second AC information here can be obtained from the received system message. For example, the UE receives the system message (SIBm) sent by the first network device, and the SIBm carries the second type of AC information; where m is an integer greater than 0. In the embodiment of the present disclosure, if the UE simultaneously obtains the second type of information for UEs in the cell and the first type of AC information for the UE group, the UE's access control can be performed based on the first type of AC information first. In this way, the embodiments of the present disclosure can realize the access control requirements for the UE group.

It should be noted that those skilled in the art can understand that the methods provided in the embodiments of the present disclosure can be executed alone or together with some methods in the embodiments of the present disclosure or some methods in related technologies.

Figure 8:
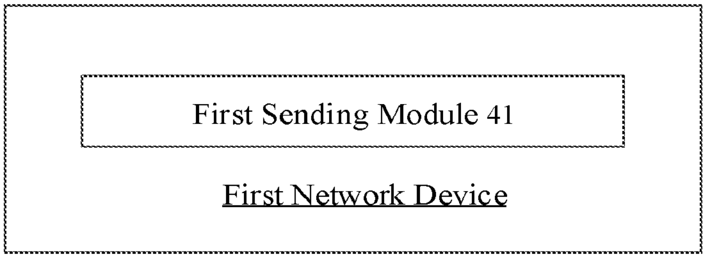
FIG. 8 is a block diagram of an access control processing apparatus according to an exemplary embodiment.

As shown in FIG. 8, an embodiment of the present disclosure provides an access control processing apparatus, which is applied to a first network device and includes:

A first sending module 41 which is configured to send AC information, where the AC information is able to control access of the UE group.

Embodiments of the present disclosure provide an access control processing apparatus, which is applied to a first network device and may include: a first sending module 41 configured to send AC information to a UE, where the AC information can control the access of a UE group.

In one embodiment, the first network device includes: a base station or a core network device.

In one embodiment, the AC information includes: first type AC information for the UE group; and/or second type AC information for all UEs in the cell.

In one embodiment, the AC information includes at least one of the followings.

The control indication, indicating whether access control is required.

The first group information, indicating the UE group that requires access control.

The second group information, indicating the UE group that does not require access control.

The status indication indicates the UE status on which the control indication applies, wherein the UE status includes: at least one of RRC connected state, RRC idle state and RRC inactive state.

The first service indication, indicating the service that requires access control.

The second service indication, indicating the service that does not require access control.

The first level indication, indicating the access level of the UE group that requires access control.

The second level indication, indicating the access level of the UE group that does not require access control.

The duration indication, indicating the barring duration of the service.

Embodiments of the present disclosure provide an access control processing apparatus, which is applied to a first network device and may include: a first sending module 41 configured to send a control indication indicating whether access control is required.

Embodiments of the present disclosure provide an access control processing apparatus, which is applied to a first network device and may include: a first sending module 41 configured to send first group information, and the first group information indicates a UE group that needs to perform access control; or, the first sending module 41 is configured to send second group information, and the second group information indicates a UE group that does not require access control.

Embodiments of the present disclosure provide an access control processing apparatus, which is applied to a first network device and may include: a first sending module 41 configured to send a first service indication indicating the service that requires access control; or, the first sending module 41 is configured to send a second service indication, and the second service indication indicates a service that does not require access control.

Disclosed embodiments provide an access control processing apparatus, which is applied to a first network device and may include: a first sending module 41 configured to send a status indication; where the status indication indicates the UE status on which the control indication applies, where, the UE state includes: at least one of RRC connected state, RRC idle state and RRC inactive state.

Embodiments of the present disclosure provide an access control processing apparatus, which is applied to a first network device and may include: a first sending module 41 configured to send a first level indication indicating the access level of the UE group that requires access control; or, the first sending module 41 is configured to send a second level indication, and the second level indication indicates the access level of the UE group that does not require access control.

Embodiments of the present disclosure provide an access control processing apparatus, which is applied to a first network device and may include: a first sending module 41 configured to send a duration indication indicating the barring duration of the service.

Embodiments of the present disclosure provide an access control processing apparatus, which is applied to a first network device and may include: a first sending module 41 configured to send AC information to the UE during the attachment process of the UE.

Embodiments of the present disclosure provide an access control processing apparatus, which is applied to a first network device and may include: a first sending module 41 configured to send AC information to a UE through broadcast signaling; or, the first sending module 41 is configured to send AC information to the UE through dedicated signaling.

Embodiments of the present disclosure provide an access control processing apparatus, which is applied to a first network device and may include: a first sending module 41 configured to send AC information to a UE through a broadcast paging message.

Embodiments of the present disclosure provide an access control processing apparatus, which is applied to a first network device and may include: a first sending module 41 configured as one of the followings.

Send AC information to UE through reconfiguration message.

Send AC information to UE through connection release message.

Send AC information to the UE through a cell handover message.

In one embodiment, the first sending module 41 is configured to send AC information to a second network device.

It should be noted that those skilled in the art can understand that the devices provided in the embodiments of the present disclosure can be executed alone or together with some devices in the embodiments of the present disclosure or some devices in related technologies.

Regarding the apparatus in the above embodiments, the specific manner in which each module performs operations has been described in detail in the embodiments related to the method, and will not be described in detail here.

Figure 9:
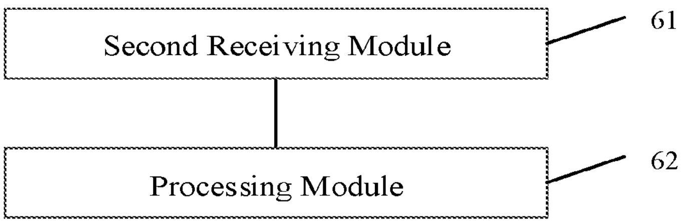
FIG. 9 is a block diagram of an access control processing apparatus according to an exemplary embodiment.

As shown in FIG. 9, an embodiment of the present disclosure provides an access control processing apparatus, which is applied to a UE and includes: a second receiving module 61 configured to receive AC information; and A processing module 62 is configured to perform access control of the UE according to the AC information and the UE group to which the UE belongs.

Embodiments of the present disclosure provide an access control processing apparatus, applied to a UE, including: a second receiving module 61 configured to receive AC information sent by a first network device.

In one embodiment, the AC information includes: first type AC information for the UE group; and/or second type AC information for all UEs in the cell.

In one embodiment, the AC information includes at least one of the followings.

The control indication, indicating whether access control is required.

The first group information, indicating the UE group that requires access control.

The second group information, indicating the UE group that does not require access control.

The status indication, indicating the UE status on which the control indication applies, wherein the UE status includes: at least one of RRC connected state, RRC idle state and RRC inactive state.

The first service indication, indicating the service that requires access control.

The second service indication, indicating the service that does not require access control.

The first level indication, indicating the access level of the UE group that requires access control.

The second level indication, indicating the access level of the UE group that does not require access control.

The duration indication, indicating the barring duration of the service.

Embodiments of the present disclosure provide an access control processing apparatus, applied to a UE, including: a second receiving module 61 configured to receive a control indication indicating whether access control is required.

Embodiments of the present disclosure provide an access control processing apparatus, applied to a UE, including: a second receiving module 61 configured to receive first group information sent by a first network device, the first group information indicating the UE group that requires access controlled; or, the second receiving module 61 is configured to receive second group information sent by the first network device, where the second group information indicates the UE group that does not require access control.

Embodiments of the present disclosure provide an access control processing apparatus, applied to a UE, including: a second receiving module 61 configured to receive a status indication sent by a first network device, indicating the UE status on which the control indication applies, wherein the UE status Including: at least one of RRC connected state, RRC idle state and RRC inactive state.

Embodiments of the present disclosure provide an access control processing apparatus, applied to a UE, including: a second receiving module 61 configured to receive a first service indication, the first service indication indicating a service that requires access control; or, the second receiving module 61 is configured to receive a second service indication, wherein the second service indication indicates a service that does not require access control.

Embodiments of the present disclosure provide an access control processing apparatus, applied to a UE, including: a second receiving module 61 configured to receive a first level indication sent by a first network device, the first level indication indicating the access level of the UE group that requires access control; or, the second receiving module 61 is configured to receive a second level indication sent by the first network device, indicating the access level of the UE group that does not require access control.

Embodiments of the present disclosure provide an access control processing apparatus, applied to a UE, including: a second receiving module 61 configured to receive a duration indication sent by the first network device. The duration indication indicates the barring duration of the service.

Embodiments of the present disclosure provide an access control processing apparatus, applied to UE, including: a second receiving module 61 configured to receive AC information sent by a core network device; or the second receiving module 61 is configured to receive AC information sent by a base station.

Embodiments of the present disclosure provide an access control processing apparatus, which is applied to a UE and includes: a second receiving module 61 configured to receive AC information during the attachment process of the UE.

Embodiments of the present disclosure provide an access control processing apparatus, applied to a UE, including: a second receiving module 61 configured to receive AC information through a broadcast signaling; or the second receiving module 61 configured to receive AC information through a dedicated signaling.

Embodiments of the present disclosure provide an access control processing apparatus, applied to a UE, including: a second receiving module 61 configured to receive AC information through a broadcast paging message.

Embodiments of the present disclosure provide an access control processing apparatus, applied to UE, including: a second receiving module 61 configured as one of the followings.

Receive AC information through a reconfiguration message.

Receive AC information through a release message.

Receive AC information through a handover message.

Embodiments of the present disclosure provide an access control processing apparatus, which is applied to a UE and includes: a processing module 62 configured to provide the AC information received by the AS of the UE to the NAS of the UE.

Embodiments of the present disclosure provide an access control processing apparatus, applied to UE, including: a processing module 62 configured to determine that the NAS does not initiate a service request for the service if it is determined based on the AC information that the service is an access-forbidden service; or, the processing module 62 is configured such that if the service is determined to be an access-allowed service based on the AC information, the NAS sends a service request for the service to the AS; wherein the service request does not carry a service indication of the service.

Embodiments of the present disclosure provide an access control processing apparatus, which is applied to a UE and includes: a processing module 62 configured to store AC information in the AS of the UE.

Embodiments of the present disclosure provide an access control processing apparatus, applied to a UE, including: a processing module 62 configured to, in response to the UE acquiring the second type of AC information for the cell and the first type of AC information for the UE group, performing access control of the UE based on the first type of AC information preferentially.

It should be noted that those skilled in the art can understand that the devices provided in the embodiments of the present disclosure can be executed alone or together with some devices in the embodiments of the present disclosure or some devices in related technologies.

Regarding the apparatus in the above embodiments, the specific manner in which each module performs operations has been described in detail in the embodiments related to the method, and will not be described in detail here.

An embodiment of the present disclosure provides a communication device, including a processor and a memory configured to store instructions executable by the processor. The processor is configured to implement the access control processing method of any embodiment of the present disclosure when running executable instructions.

In one embodiment, the communication device may be a network device or a UE. The network device may be a base station or a core network device; the UE may be a UE including multiple SIMs.

The processor may include various types of storage media, which are non-transitory computer storage media that can continue to store the information stored thereon after the user equipment is powered off.

The processor may be connected to the memory through a bus or the like, and be used to read the executable program stored on the memory, for example, at least one of the methods shown in FIGS. 3 to 7.

An embodiment of the present disclosure also provides a computer storage medium. The computer storage medium stores a computer executable program. When the executable program is executed by a processor, the access control processing method of any embodiment of the present disclosure is implemented. For example, at least one of the methods shown in FIGS. 3 to 7.

For the apparatus or storage medium in the above embodiments, the specific manner in which each module performs operations has been described in detail in the embodiments related to the method, and will not be described in detail here.

Technical solutions provided by the embodiments of the present disclosure may include the following beneficial effects:

In the embodiment of the present disclosure, the first network device sends AC information that can control the access of the UE group, so that the UE accurately knows whether access control is required for the group to which it belongs. This is conducive to realizing the need for access control of multiple UEs when multiple UEs need to perform access control, that is, realizing collaborative processing of multi-modal services; this can reduce the situation that multiple UEs request to establish service while only part of the service requests are completed, thereby optimizing the communication between the UE and the network.

Figure 10:
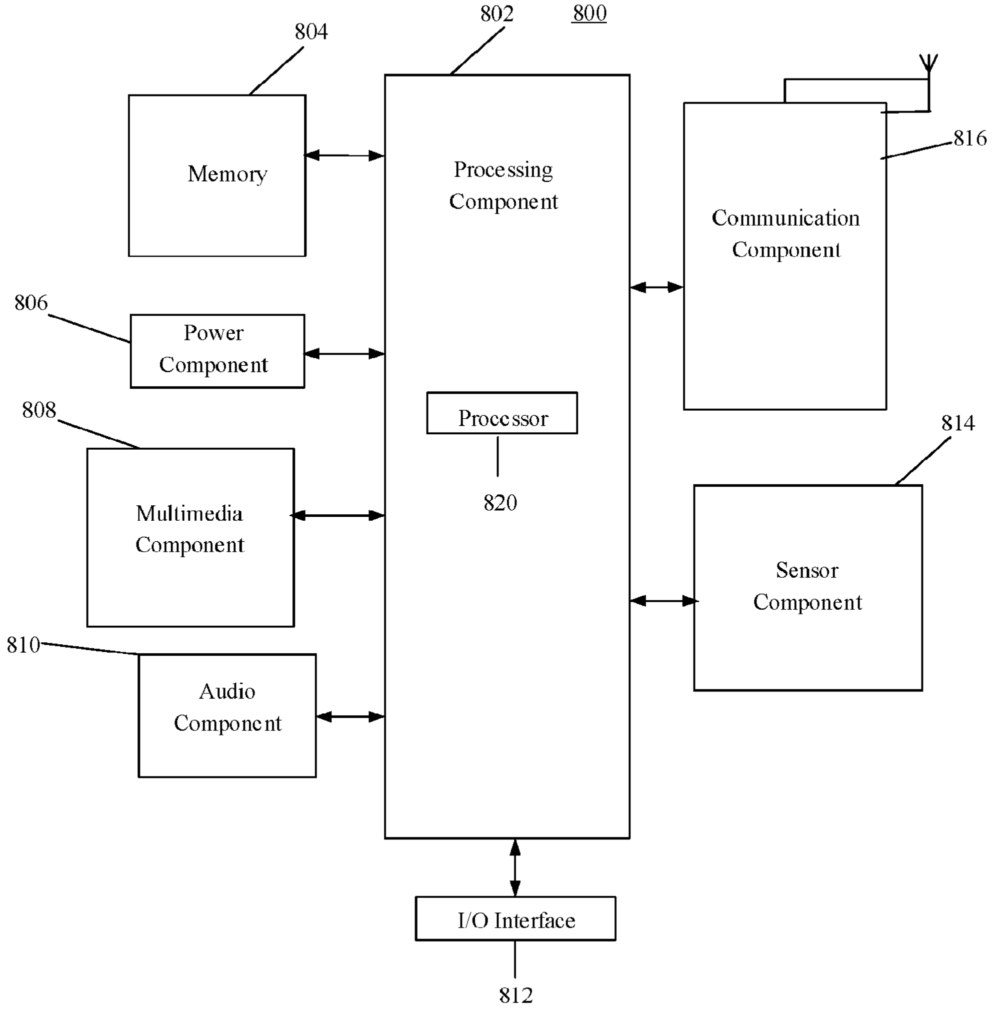
FIG. 10 is a block diagram of a UE according to an exemplary embodiment.

FIG. 10 is a block diagram of a user equipment 800 according to an exemplary embodiment. For example, the user equipment 800 may be a mobile phone, a computer, a digital broadcast user device, a messaging device, a game console, a tablet device, a medical device, a fitness device, a personal digital assistant, or the like.

Referring to FIG. 10, the user equipment 800 may include one or more of the following components: a processing component 802, a memory 804, a power supply component 806, a multimedia component 808, an audio component 810, an input/output (I/O) interface 812, and a sensor component. 814, and communications component 816.

The processing component 802 generally controls the overall operations of the user equipment 800, such as operations associated with display, telephone calls, data communications, camera operations, and recording operations. The processing component 802 may include one or more processors 820 to execute instructions to complete all or part of the steps of the above method. Additionally, processing component 802 may include one or more modules that facilitate interaction between processing component 802 and other components. For example, processing component 802 may include a multimedia module to facilitate interaction between multimedia component 808 and processing component 802.

The memory 804 is configured to store various types of data to support operations at the user equipment 800. Examples of such data include instructions for any application or method operating on the user equipment 800, contact data, phonebook data, messages, pictures, videos, etc. The memory 804 can be realized by any type of volatile or non-volatile storage device or their combination, such as static random access memory (SRAM), electrically erasable programmable read only memory (EEPROM), erasable programmable read only memory (EPROM), programmable read only memory (PROM), read only memory (ROM), magnetic memory, flash memory, magnetic disk or optical disk.

The power supply component 806 provides power to various components of the user equipment 800. The power component 806 may include a power management system, one or more power supplies, and other components associated with generating, managing, and distributing power for user equipment 800.

The multimedia component 808 includes a screen providing an output interface between the user equipment 800 and the user. In some embodiments, the screen may include a liquid crystal display (LCD) and a touch panel (TP). If the screen includes a touch panel, the screen may be implemented as a touch screen to receive input signals from a user. The touch panel includes one or more touch sensors to sense touches, swipes, and gestures on the touch panel. The touch sensor may not only sense a boundary of a touch or a swipe action, but also detect duration and pressure associated with the touch or swipe operation. In some embodiments, the multimedia component 808 includes a front camera and/or a rear camera. When the user equipment 800 is in an operation mode, such as a photographing mode or a video mode, the front camera and/or the rear camera can receive external multimedia data. Each front camera and rear camera can be a fixed optical lens system or have focal length and optical zoom capability.

The audio component 810 is configured to output and/or input audio signals. For example, the audio component 810 includes a microphone (MIC), which is configured to receive an external audio signal when the user equipment 800 is in an operation mode, such as a call mode, a recording mode and a voice recognition mode. Received audio signals may be further stored in memory 804 or sent via communication component 816. In some embodiments, the audio component 810 also includes a speaker for outputting audio signals.

The I/O interface 812 provides an interface between the processing component 802 and a peripheral interface module, which may be a keyboard, a click wheel, a button, and the like. These buttons may include, but are not limited to: a home button, volume buttons, start button, and lock button.

The sensor component 814 includes one or more sensors for providing user equipment 800 with various aspects of status assessment. For example, the sensor component 814 can detect the open/closed state of the user equipment 800, the relative positioning of components, such as the display and the keypad of the user equipment 800, the sensor component 814 can also detect the user equipment 800 or a change in the position of a component of the user equipment 800, the presence or absence of user's contact with the user equipment 800, the change of orientation or acceleration/deceleration of the user equipment 800 and the temperature change of the user equipment 800. The sensor component 814 may include a proximity sensor configured to detect the presence of nearby objects in the absence of any physical contact. The sensor component 814 may also include an optical sensor, such as a CMOS or CCD image sensor, for use in imaging applications. In some embodiments, the sensor component 814 may also include an acceleration sensor, a gyroscope sensor, a magnetic sensor, a pressure sensor or a temperature sensor.

The communication component 816 is configured to facilitate wired or wireless communication between the user equipment 800 and other devices. The user equipment 800 can access a wireless network based on communication standards, such as WiFi, 2G or 3G, or a combination thereof. In an exemplary embodiment, the communication component 816 receives broadcast signals or broadcast related information from an external broadcast management system via a broadcast channel. In an exemplary embodiment, the communication component 816 also includes a near field communication (NFC) module to facilitate short-range communication. For example, the NFC module can be implemented based on radio frequency identification (RFID) technology, infrared data association (IrDA) technology, ultra wideband (UWB) technology, bluetooth (BT) technology and other technologies.

In an exemplary embodiment, user equipment 800 may be implemented by one or more application specific integrated circuits (ASIC), digital signal processors (DSP), digital signal processing devices (DSPD), programmable logic devices (PLD), field programmable gate array (FPGA), controllers, microcontrollers, microprocessors or other electronic components for performing the method described above.

In an exemplary embodiment, there is also provided a non-transitory computer-readable storage medium including instructions, such as the memory 804 including instructions, which can be executed by the processor 820 of the user equipment 800 to implement the above method. For example, the non-transitory computer readable storage medium may be ROM, random access memory (RAM), CD-ROM, magnetic tape, floppy disk, and optical data storage device, and the like.

Figure 11:
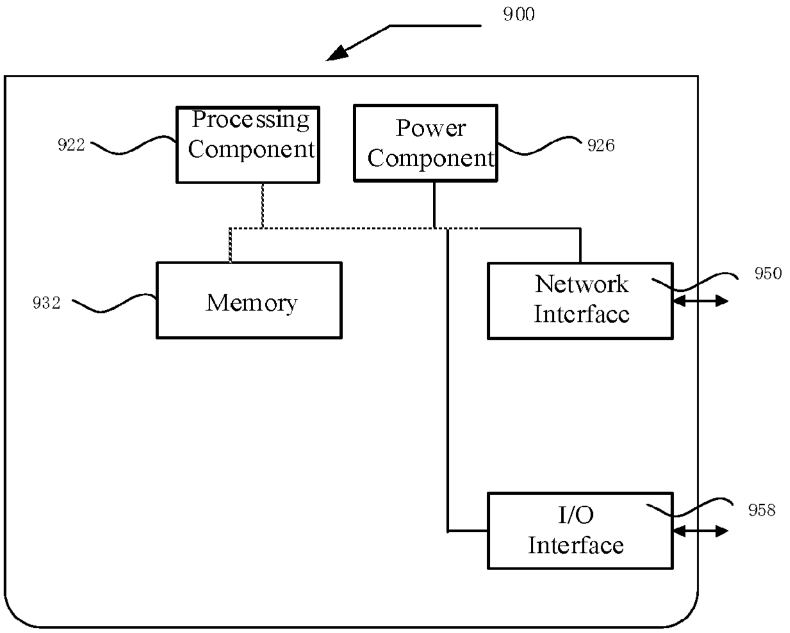
FIG. 11 is a block diagram of a base station according to an exemplary embodiment.

As shown in FIG. 11, an embodiment of the present disclosure shows a structure of a base station. For example, the base station 900 may be provided as a network side device. Referring to FIG. 11, the base station 900 includes a processing component 922, which further includes one or more processors, and a memory resource represented by a memory 932 for storing instructions executable by the processing component 922, such as application programs. The application program stored in memory 932 may include one or more modules each corresponding to a set of instructions. In addition, the processing component 922 is configured to execute instructions, so as to perform any of the aforementioned methods applied to the base station, e.g., the method shown in FIGS. 4 to 10.

Base station 900 may also include a power component 926 configured to perform power management of base station 900, a wired or wireless network interface 950 configured to connect base station 900 to a network, and an input-output (I/O) interface 958. The base station 900 can operate based on an operating system stored in the memory 932, such as Windows Server™, Mac OS X™, Unix™, Linux™, FreeBSD™ or the like.

Other embodiments of the disclosure will be readily apparent to those skilled in the art from consideration of the specification and practice of the disclosure disclosed herein. This disclosure is intended to cover any modification, use or adaptation of the present disclosure, these modifications, uses or adaptations follow the general principles of the present disclosure and include common knowledge or conventional technical means in the technical field not disclosed in this disclosure. The specification and examples are to be considered exemplary only, with a true scope and spirit of the disclosure being indicated by the following claims.

It should be understood that the present disclosure is not limited to the precise constructions which have been described above and shown in the accompanying drawings, and various modifications and changes may be made without departing from the scope thereof. The scope of the disclosure is limited only by the appended claims.

What is claimed is:

1. An access control processing method, executed by a first network device and comprising:

sending access control AC information, wherein the AC information is able to control access of a user equipment UE group, and wherein controlling the access of the UE group comprises performing AC barring check for the UE group, wherein the AC information is configured to be provided, after being received by an access stratum AS of a UE belonging to the UE group, from the AS of the UE to a non-access stratum NAS of the UE, wherein the AC information is configured such that, in response to a service being determined as an access-barred service based on the AC information, the UE is in a state in which the NAS does not initiate a service request for the service, and wherein the AC information is configured such that, in response to the service being determined as an access-allowed service based on the AC information, the UE is in a state in which the NAS sends the service request for the service to the AS, wherein the service request does not carry a service indication of the service.

2. The method according to claim 1, wherein the AC information comprises at least one of:

first type of AC information for the UE group;

or, second type of AC information for all UEs in a cell.

3. The method according to claim 1, wherein the AC information comprises at least one of:

a control indication, indicating whether access control is required;

first group information, indicating the UE group that requires access control;

second group information, indicating the UE group that does not require access control;

a status indication, indicating a UE status on which the control indication applies, wherein the UE status comprises: at least one of radio resource control RRC connected state, RRC idle state or RRC inactive state;

a first service indication, indicating a service that requires access control;

a second service indication, indicating a service that does not require access control;

a first level indication, indicating an access level of the UE group that requires access control;

a second level indication, indicating an access level of the UE group that does not require access control; or a duration indication, indicating a barring duration of a service.

4. The method according to claim 1, wherein the first network device comprises: a base station or a core network device.

5. The method according to claim 1, wherein the sending access control AC information comprises at least one of:

sending the AC information to a UE during an attachment process of the UE;

sending the AC information to the UE through a broadcast signaling; or sending the AC information to the UE through a dedicated signaling.

6. The method according to claim 5, wherein the sending the AC information to the UE comprises at least one of:

sending the AC information to the UE through a broadcast paging message;

sending the AC information to the UE through a reconfiguration message;

sending the AC information to the UE through a connection release message; or sending the AC information to the UE through a cell handover message.

7. The method according to claim 1, wherein the sending access control AC information comprises:

sending the AC information to a second network device.

8. An access control processing method, executed by a user equipment UE and comprising:

receiving access control AC information; and performing access control of the UE according to the AC information and a UE group to which the UE belongs, wherein the method further comprises providing, by an access stratum AS of the UE, the AC information received by the AS to a non-access stratum NAS of the UE, and wherein the method further comprises:

in response to determining that a service is an access-barred service based on the AC information, determining that the NAS does not initiate a service request for the service; and in response to determining that a service is an access-allowed service based on the AC information, sending, by the NAS, a service request for the service to the AS; wherein the service request does not carry a service indication of the service.

9. The method according to claim 8, wherein the AC information comprises at least one of:

first type of AC information for the UE group;

or, second type of AC information for all UEs in a cell.

10. The method according to claim 8, wherein the AC information comprises at least one of:

a control indication, indicating whether access control is required;

first group information, indicating the UE group that requires access control;

second group information, indicating the UE group that does not require access control;

a status indication, indicating a UE status on which the control indication applies, wherein the UE status comprises: at least one of radio resource control RRC connected state, RRC idle state or RRC inactive state;

a first service indication, indicating a service that requires access control;

a second service indication, indicating a service that does not require access control;

a first level indication, indicating an access level of the UE group that requires access control;

a second level indication, indicating an access level of the UE group that does not require access control; or a duration indication, indicating a barring duration of a service.

11. The method according to claim 8, wherein the receiving access control AC information comprises one of:

receiving the AC information sent by a core network device; and receiving the AC information sent by a base station.

12. The method according to claim 8, wherein the receiving access control AC information comprises at least one of:

receiving the AC information during an attachment process of the UE;

receiving the AC information through a broadcast signaling; and receiving the AC information through a dedicated signaling.

13. The method according to claim 12, wherein the receiving the AC information through comprises at least one of:

receiving the AC information through a broadcast paging message;

receiving the AC information through a reconfiguration message;

receiving the AC information through a release message; or receiving the AC information through a handover message.

14. The method according to claim 8, further comprising:

storing the AC information in the AS of the UE.

15. The method according to claim 9, further comprising:

in response to the UE obtaining the second type of AC information for the cell and the first type of AC information for the UE group, performing access control of the UE based on the first type of AC information preferentially.

16. A first network device, comprising:

a processor; and memory for storing instructions executable by the processor;

wherein, the processor is configured to implement the access control processing method according to claim 1 when running the executable instructions.

17. A user equipment UE, comprising:

a processor; and memory for storing instructions executable by the processor;

wherein, the processor is configured to implement the access control processing method according to claim 8 when running the executable instructions.

* * * * *